United States Patent
Kobayashi

(10) Patent No.: US 10,175,680 B2
(45) Date of Patent: Jan. 8, 2019

(54) THREE-DIMENSIONAL PRINTING SYSTEM INCLUDING THREE-DIMENSIONAL PRINTING APPARATUS AND SUPPORT ARRANGEMENT DETERMINING APPARATUS, AND METHOD OF DETERMINING SUPPORT ARRANGEMENT

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 294 days.

(21) Appl. No.: 15/184,058

(22) Filed: Jun. 16, 2016

(65) Prior Publication Data
US 2016/0368222 A1    Dec. 22, 2016

(30) Foreign Application Priority Data
Jun. 17, 2015  (JP) .................................. 2015-122387

(51) Int. Cl.
*G05B 19/4099* (2006.01)
*B29C 64/129* (2017.01)
(Continued)

(52) U.S. Cl.
CPC ......... *G05B 19/4099* (2013.01); *B23Q 15/22* (2013.01); *B29C 64/129* (2017.08);
(Continued)

(58) Field of Classification Search
CPC . B29C 67/0088; B29C 64/129; B29C 64/386; B29C 67/007; B33Y 10/00; B33Y 30/00; B33Y 50/02; G05B 19/4099; G05B 2219/35134; G05B 2219/49007; G06F 2217/12
(Continued)

(56) References Cited

U.S. PATENT DOCUMENTS

| | | | |
|---|---|---|---|
| 5,402,351 A * | 3/1995 | Batchelder | B29C 41/36 264/401 |
| 2002/0155189 A1 | 10/2002 | John | |

(Continued)

FOREIGN PATENT DOCUMENTS

JP    2003-039564 A    2/2003

*Primary Examiner* — Chun Cao
(74) *Attorney, Agent, or Firm* — Keating & Bennett, LLP

(57) ABSTRACT

An arrangement determining apparatus includes a storing processor that stores data of a three-dimensional model of the target object, a reference processor that shifts and rotates the three-dimensional model, a center-of-gravity calculating processor that calculates a center of gravity of the three-dimensional model, a principal axis setting processor that calculates a farthest point that is most distant from the center of gravity of the three-dimensional model, and sets a principal axis connecting the center of gravity of the three-dimensional model and the farthest point, a tilting processor that tilts the three-dimensional model so that the principal axis is parallel or substantially parallel to a horizontal plane, and an arranging processor that attaches and arranges the supports on a top surface or a bottom surface of the three-dimensional model.

10 Claims, 9 Drawing Sheets

(51) Int. Cl.
 *B29C 64/386* (2017.01)
 *B23Q 15/22* (2006.01)
 *B33Y 50/02* (2015.01)
 *B33Y 10/00* (2015.01)
 *B33Y 30/00* (2015.01)

(52) U.S. Cl.
 CPC ............ *B29C 64/386* (2017.08); *B33Y 10/00* (2014.12); *B33Y 30/00* (2014.12); *B33Y 50/02* (2014.12); *G05B 2219/35134* (2013.01); *G05B 2219/49007* (2013.01); *G05B 2219/49023* (2013.01); *G05B 2219/49038* (2013.01); *G06F 2217/12* (2013.01)

(58) Field of Classification Search
 USPC .................................................. 700/98, 118
 See application file for complete search history.

(56) References Cited

U.S. PATENT DOCUMENTS

| | | | | |
|---|---|---|---|---|
| 2015/0134095 | A1* | 5/2015 | Hemani | G06T 19/00 700/98 |
| 2016/0096330 | A1* | 4/2016 | Trowbridge | B33Y 10/00 264/104 |
| 2016/0136896 | A1* | 5/2016 | Wighton | B29C 67/0088 700/120 |
| 2016/0368223 | A1* | 12/2016 | Kobayashi | B29C 67/0088 |
| 2017/0173891 | A1* | 6/2017 | Bosveld | B29C 64/106 |

\* cited by examiner

THREE-DIMENSIONAL PRINTING SYSTEM INCLUDING THREE-DIMENSIONAL PRINTING APPARATUS AND SUPPORT ARRANGEMENT DETERMINING APPARATUS, AND METHOD OF DETERMINING SUPPORT ARRANGEMENT

CROSS REFERENCE TO RELATED APPLICATION

The present application claims priority from Japanese Patent Application No. 2015-122387, filed on Jun. 17, 2015, which is incorporated by reference herein in its entirety.

BACKGROUND OF THE INVENTION

1. Field of the Invention

The present invention relates to a support arrangement determining apparatus, a three-dimensional printing system, and a method of determining a support arrangement.

2. Description of the Related Art

A three-dimensional printing apparatus for forming a desired three-dimensional printed object (hereinafter referred to as a "target object") by successively stacking layers of a resin material each having a predetermined cross-sectional shape and curing the resin material is conventionally known. This type of three-dimensional printing apparatus forms a target object in the following manner. First, data of a cross-sectional shape of the target object are prepared using, for example, a CAD apparatus. Next, using the data of the cross-sectional shape, a resin layer having a corresponding shape to the cross-sectional shape is formed by curing a photocurable resin. Then, the resin layers corresponding to the cross-sectional shapes are successively stacked to form the target object.

As shown in JP 2003-39564 A, for example, the three-dimensional printing apparatus has a platform having an opening formed therein, a vat placed on the platform, for accommodating a photocurable resin, a holder disposed above the vat and capable of being raised and lowered, and a lighting device disposed below the platform, for emitting light. The light emitted from the lighting device is applied to the photocurable resin in the vat through the opening in the platform. The part of the photocurable resin in the vat that is exposed to the light is cured. By controlling the position of the light to be applied, the position of the resin to be cured can be changed as desired. As a result, a resin layer having a desired cross-sectional shape can be formed. Then, by elevating the holder step by step, resin layers can be formed consecutively toward the bottom. In this way, the desired target object is formed.

When elevating the holder step by step, a resin layer that has been formed needs to support the load of all the resin layers that are to be formed below that resin layer. If there is a resin layer with a small cross-sectional area, it is possible that the resin layer with a small cross-sectional area may not be able to support the load of all the resin layers therebelow. As a consequence, part of the target object may break while forming the target object. In order to prevent such breakage, as illustrated in FIG. 13, a plurality of support objects 130 for supporting part of the load of a target object 170 are attached between a portion of the target object 170 and a holder 113 while forming the object through computing with a dedicated apparatus, such as a CAD apparatus. Then, a whole object including the target object 170 and the support objects 130 integrated with each other is formed. Hereinafter, the support objects may simply be referred to as "supports."

The supports 130 are attached and arranged, for example, on one of the surfaces of the target object 170 that faces the holder 113. However, depending on the orientation of the target object 170 with respect to the holder 113, the surface of projection of the target object 170 with respect to the holder 113 has a small area, that is, the surface of projection that represents the outer circumferential shape of the target object 170 that is obtained when projecting the target object 170 onto the surface of the holder 113 facing the target object 170 has a small area. As a consequence, the number of the supports 130 attached on the target object 170 becomes insufficient, so that the supports 130 may not be able to sufficiently support the load of the target object 170 during object formation.

SUMMARY OF THE INVENTION

Preferred embodiments of the present invention provide a support arrangement determining apparatus, a three-dimensional printing system, and a method of determining a support arrangement that attach and arrange supports optimally with a three-dimensional printing apparatus wherein supports are attached and arranged onto a target object to be formed to form the target object.

A support arrangement determining apparatus according to a preferred embodiment of the present invention is an arrangement determining apparatus that determines a position arrangement of supports, for use with a three-dimensional printing apparatus wherein the supports are attached and arranged on a target object to be formed to form the target object and the supports. The arrangement determining apparatus includes a storing processor, a reference processor, a center-of-gravity calculating processor, a principal axis setting processor, a tilting processor, and an arranging processor. The storing processor is configured or programmed to store data of a three-dimensional model of the target object model. The reference processor is configured or programmed to shift and rotate the three-dimensional model stored in the storing processor so as to set the three-dimensional model into a predetermined reference position and orientation. The center-of-gravity calculating processor is configured or programmed to calculate a center of gravity of the three-dimensional model. The principal axis setting processor is configured or programmed to calculate, among points on outer circumferential surfaces of the three-dimensional model, a farthest point that is most distant from the center of gravity of the three-dimensional model calculated by the center-of-gravity calculating processor, and set a principal axis connecting the center of gravity of the three-dimensional model and the farthest point. The tilting processor is configured or programmed to tilt the three-dimensional model set in the predetermined reference position and orientation by the reference processor so that the principal axis set by the principal axis setting processor is parallel or substantially parallel to a horizontal plane. The arranging processor is configured or programmed to attach and arrange the supports on a top surface or a bottom surface of the three-dimensional model tilted by the tilting processor.

In the arrangement determining apparatus, the tilting processor tilts the three-dimensional model so that the principal axis of the three-dimensional model is parallel or substantially parallel to the horizontal plane. The principal axis is the line connecting the center of gravity of the three-dimensional model with a farthest point that is one of the points on the outer circumferential surfaces of the three-dimensional model and that is most distant from the center of gravity of the three-dimensional model. This enables the top surface or the bottom surface of the three-dimensional model that has been tilted by the tilting processor to have a sufficient but not excessive area for providing and attaching the supports in such a number or amount that is necessary to support the load of the target object. As a result, the supports are attached and arranged in a number or amount that is necessary to support the load of the target object on the top surface or the bottom that is allowed to have an area necessary to attach the supports, so that the supports sufficiently support the load of the target object during object formation. The supports are attached and arranged in an optimum manner.

In a preferred embodiment of the present invention, the support arrangement determining apparatus also includes a rotation processor configured or programmed to calculate a nearest point that is the closest point to the center of gravity of the three-dimensional model among the points on the outer circumferential surfaces of the three-dimensional model tilted by the tilting processor, and rotate the three-dimensional model around the principal axis so as to set the nearest point into a position that overlaps the principal axis when viewed in a plan view. The arranging processor is configured or programmed to attach and arrange the supports on one of the top surface and the bottom surface on which the nearest point is positioned in the three-dimensional model tilted by the tilting processor.

The present preferred embodiment enables the supports to be attached and arranged on a surface of the three-dimensional model that contains the nearest point, which is the closest point from the center of gravity of the three-dimensional model. In other words, it is possible to shorten the distance between the center of gravity of the three-dimensional model and the surface of the three-dimensional model on which the supports are to be formed. The closer the center of gravity of the three-dimensional model is to the surface on which the supports are to be arranged, the more stable the target object is during object formation. Thus, the three-dimensional printing apparatus is able to form the target object and the supports for the target object being in a stable state.

In another preferred embodiment of the present invention, the target object includes a forbidden surface where the supports are not attached or arranged. The rotation processor is configured or programmed to calculate the nearest point among the points on the outer circumferential surfaces excluding the forbidden surface.

In some cases, the target object to be formed may include a surface on which no support should be attached or arranged. In various preferred embodiments of the present invention, the surface of the target object on which no support should be attached or arranged is defined as a forbidden surface. The present preferred embodiment enables the rotation processor not to set the nearest point on the forbidden surface. As a result, the supports are able to support the load of the target object without attaching and arranging the supports on the forbidden surface.

In another preferred embodiment of the present invention, the three-dimensional model is obtained by combining a plurality of polygons. The center-of-gravity calculating processor is configured or programmed to calculate the center of gravity of the three-dimensional model using centers of gravity of the plurality of polygons. The principal axis setting processor is configured or programmed to calculate respective distances between the center of gravity of the three-dimensional model calculated by the center-of-gravity calculating processor and the centers of gravity of the plurality of polygons, and sets the principal axis to extend along a line connecting the center of gravity of the three-dimensional model and a point at the center of gravity of one of the polygons having the greatest distance between the center of gravity of the three-dimensional model and the centers of gravity of the polygons.

In the present preferred embodiment, the principal axis setting processor sets the principal axis of the three-dimensional model using the centers of gravity of the plurality of polygons that have already been calculated by the center-of-gravity calculating processor. Therefore, the principal axis setting processor does not need to calculate the centers of gravity of the plurality of polygons again. This allows the principal axis setting processor to reduce the process time required to set the principal axis of the three-dimensional model.

In another preferred embodiment of the present invention, the support arrangement determining apparatus includes a pre-processing processor configured or programmed to perform a smoothing process on the three-dimensional model stored in the storing processor. The reference processor is configured or programmed to shift and rotate the three-dimensional model that has been subjected to the smoothing process by the pre-processing processor so as to set the three-dimensional model into a predetermined reference position and orientation.

The present preferred embodiment makes it possible to reduce the amount of data of the three-dimensional model by smoothing the three-dimensional model with the pre-processing processor. Therefore, the reference processor, the center-of-gravity calculating processor, the principal axis setting processor, the tilting processor, the rotation processor, and the arranging processor are allowed to use a three-dimensional model whose amount of data is reduced by the pre-processing processor. As a result, the computational burden is lowered in a desirable manner.

A three-dimensional printing system according to a preferred embodiment of the present invention includes a three-dimensional printing apparatus, and a support arrangement determining apparatus according to one of the various preferred embodiments described above.

The present preferred embodiment provides a three-dimensional printing system including a support arrangement determining apparatus according to one of the various preferred embodiments described above.

A method of determining a support arrangement according to a preferred embodiment of the present invention is a method for determining a position arrangement of supports, for use with a three-dimensional printing apparatus wherein the supports are attached and arranged on a target object to be formed to form the target object and the supports. The method of determining a support arrangement includes a storing step, a reference step, a center-of-gravity calculating step, a principal axis setting step, a tilting step, and an arranging step. The storing step stores data of a three-dimensional model of the target object. The reference step shifts and rotates the three-dimensional model stored in the storing step so as to set the three-dimensional model into a predetermined reference position and orientation. The center-of-gravity calculating step calculates a center of gravity of the three-dimensional model. The principal axis setting step calculates, among points on outer circumferential surfaces of the three-dimensional model, a farthest point that is most distant from the center of gravity of the three-dimensional model calculated in the center-of-gravity calculating step, and sets a principal axis connecting the center of gravity of the three-dimensional model and the farthest point. The tilting step tilts the three-dimensional model set in the predetermined reference position and orientation in the reference step so that the principal axis set in the principal axis setting step is parallel or substantially parallel to a horizontal plane. The arranging step attaches and arranges the supports on a top surface or a bottom surface of the three-dimensional model tilted in the tilting step.

In another preferred embodiment of the present invention, the method further includes a rotation step of calculating a nearest point that is the closest point from the center of gravity of the three-dimensional model among the points on the outer circumferential surfaces of the three-dimensional model tilted in the tilting step, and rotating the three-dimensional model around the principal axis so as to set the nearest point into a position that overlaps the principal axis when viewed in a plan view. The arranging step attaches and arranges the supports on one of the top surface and the bottom surface on which the nearest point is positioned in the three-dimensional model tilted in the tilting step.

In another preferred embodiment of the present invention, the target object includes a forbidden surface where the supports are not attached or arranged. The rotation step calculates the nearest point among the points on the outer circumferential surfaces excluding the forbidden surface.

In another preferred embodiment of the present invention, the three-dimensional model is obtained by combining a plurality of polygons. The center-of-gravity calculating step calculates the center of gravity of the three-dimensional model using centers of gravity of the plurality of polygons. The principal axis setting step calculates respective distances between the center of gravity of the three-dimensional model calculated in the center-of-gravity calculating step and the centers of gravity of the plurality of polygons, and sets the principal axis to be a line connecting the center of gravity of the three-dimensional model and a point at the center of gravity of one of the polygons having the greatest distance between the center of gravity of the three-dimensional model and the centers of gravity of the polygons.

In another preferred embodiment of the present invention, the method further includes a pre-processing step of performing a smoothing process on the three-dimensional model stored in the storing step. In the reference step, the three-dimensional model that has been subjected to the smoothing process in the pre-processing step is shifted and rotated so as to set the three-dimensional model into a predetermined reference position and orientation.

According to various preferred embodiments of the present invention, supports are attached and arranged on a target object in an optimum manner.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, three-dimensional printing systems including support arrangement determining apparatuses according to preferred embodiments of the present invention, as well as methods of determining a support arrangement, will be described with reference to the drawings. The preferred embodiments described herein are not intended to limit the present invention. The features, components and steps that exhibit the same effects are denoted by the same reference symbols, and repetitive description thereof may be omitted as appropriate.

Figure 1:
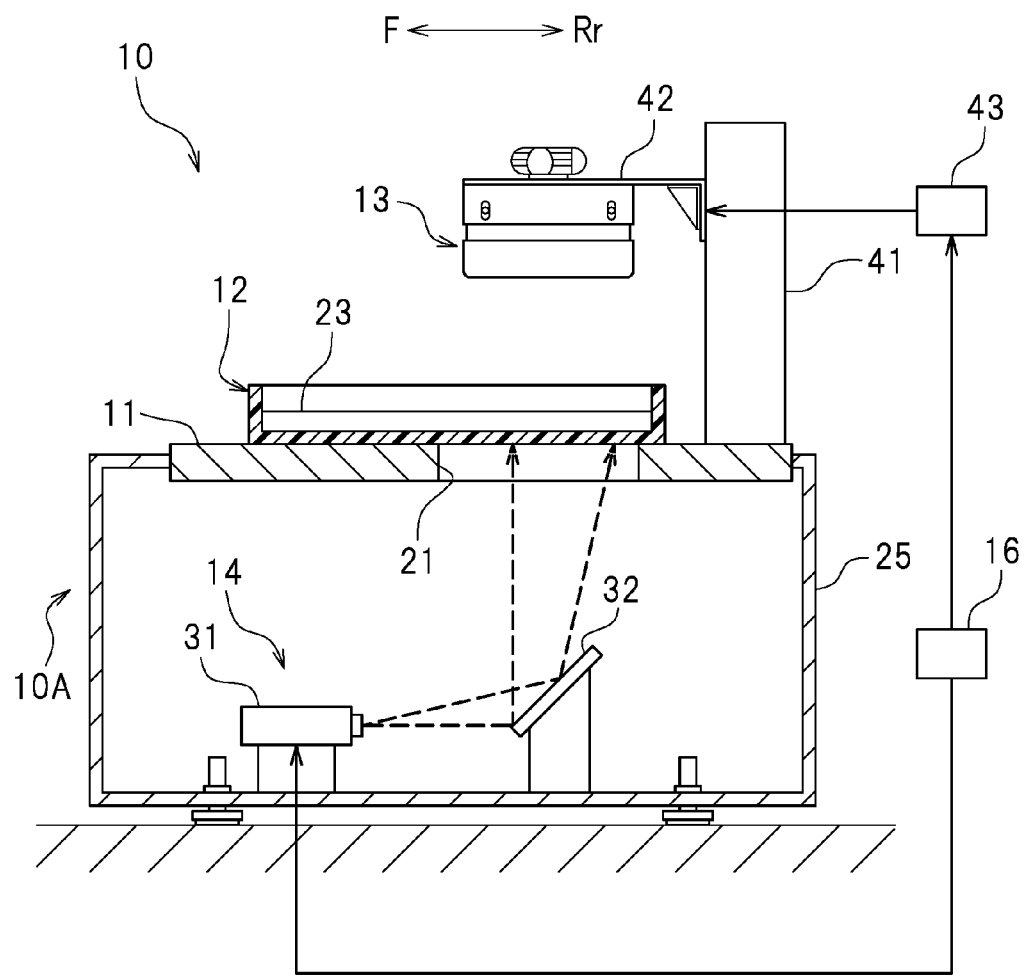
FIG. 1 is a cross-sectional view of a three-dimensional printing system according to a preferred embodiment of the present invention.
Figure 2:
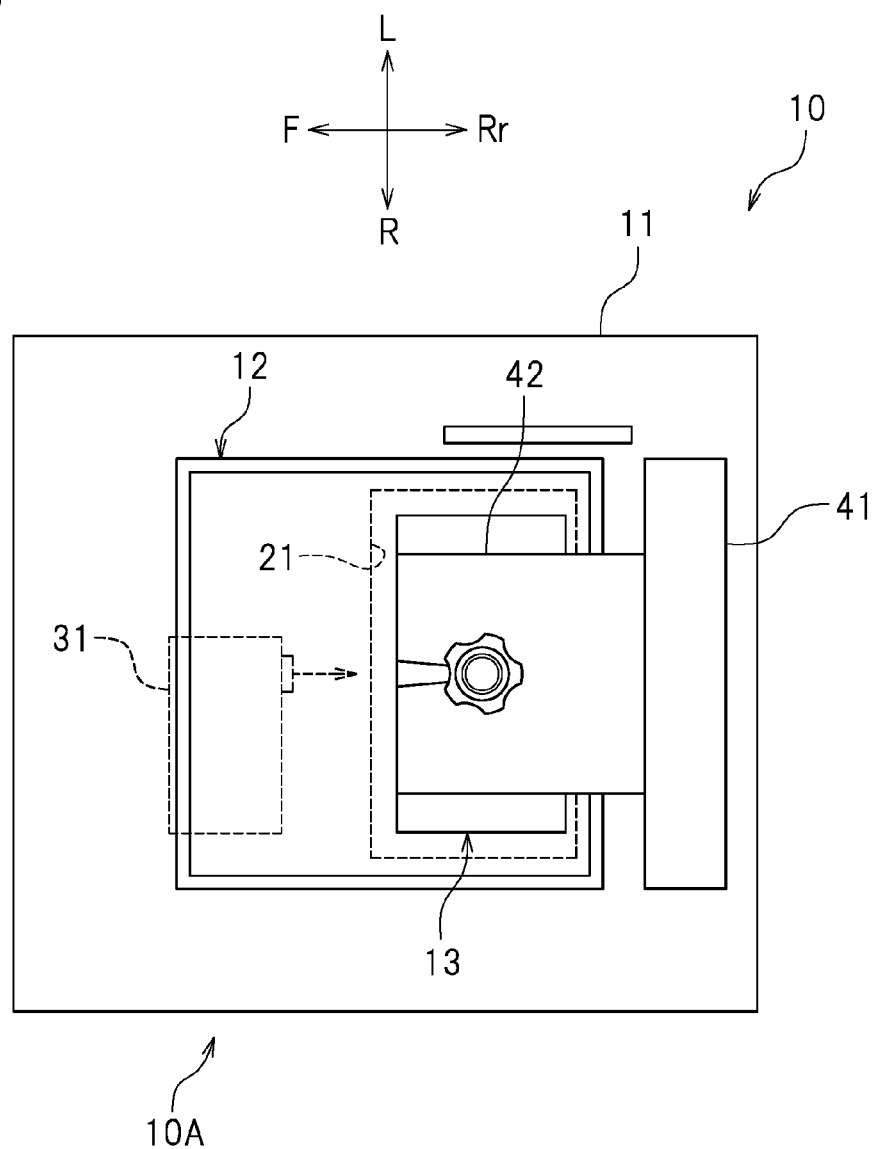
FIG. 2 is a plan view of a three-dimensional printing system according to a preferred embodiment of the present invention.

FIG. 1 is a cross-sectional view of a three-dimensional printing system 10 according to the present preferred embodiment. FIG. 2 is a plan view of the three-dimensional printing system 10. In the drawings, reference characters F, Rr, L, and R indicate front, rear, left, and right, respectively. These directional terms are, however, merely provided for purposes in illustration and are not intended to limit the preferred embodiments of the three-dimensional printing system 10 in any way.

The three-dimensional printing system 10 is a system that can form a target object by attaching and arranging supports on the target object. Hereinafter, the entirety of the target object to which the supports are attached is referred to as a "whole object". The three-dimensional printing system 10 uses data of a plurality of cross-sectional shapes of the whole object. Here, the term "cross-sectional shape" refers to the shape of the cross section of each of the layers when the whole object is divided into a plurality of layers. The three-dimensional printing system 10 forms resin layers having shapes corresponding to the cross-sectional shapes by curing a liquid photocurable resin. Then, the resin layers are stacked successively layer by layer to form the whole object. Note that the term "photocurable resin" refers to a resin that is cured when exposed to light containing a predetermined wavelength.

As illustrated in FIG. 1, the three-dimensional printing system 10 includes a three-dimensional printing apparatus 10A and an arrangement determining apparatus 100 (see FIG. 7) to determine the orientation of the target object and also determine the position arrangement of the supports before forming the whole object with the three-dimensional printing apparatus 10A.

The three-dimensional printing apparatus 10A includes a platform 11, a vat 12, a holder 13, a lighting device 14, and a controller 16.

The platform 11 is supported by a case 25. An opening through which light is allowed to pass is provided in the platform 11. The vat 12 accommodates a liquid photocurable resin 23. The vat 12 is provided on the platform 11. As illustrated in FIG. 2, the vat 12 covers the opening 21 of the platform 11 when placed on the platform 11. The vat 12 is formed of a material capable of transmitting light. For example, the vat 12 is formed of a transparent material.

As illustrated in FIG. 1, the holder 13 is disposed above the vat 12 and above the opening 21 of the platform 11. The holder 13 is configured or programmed to be capable of being raised and lowered. The holder 13 is immersed into the photocurable resin 23 in the vat 12 when it is lowered. When it is raised, the holder 13 lifts the photocurable resin 23 that has been cured by exposure to the light. Herein, the platform 11 is provided with a supporting pillar 41 extending vertically. A slider 42 is mounted in front of the supporting pillar 41. The slider 42 is capable of being raised and lowered along the supporting pillar 41. The slider 42 is moved upward or downward by a motor 43. Herein, the holder 13 is fitted to the slider 42. The holder 13 is moved upward or downward by the motor 43.

The lighting device 14 is disposed below the platform 11. The lighting device 14 applies light having a predetermined wavelength to the photo-curable resin 23 accommodated in the vat 12. The lighting device 14 is accommodated in a case 25 provided below the platform 11. The lighting device 14 includes a projector 31 and a mirror 32. The projector 31 is a light source that emits light. The mirror 32 reflects the light emitted from the projector 31 toward the vat 12. The mirror 32 is disposed below the opening 21 in the platform 11 and behind the projector 31. The light emitted from the projector 31 is reflected by the mirror 32, and is applied through the opening 21 of the platform 11 to the photocurable resin 23 in the vat 12. It should be noted, however, that the arrangement and configuration of the lighting device 14 are not restricted to particular arrangements or configurations.

The controller 16 is connected to the motor 43, which controls the slider 42 fitted with the holder 13 to be raised and lowered, and is connected to the projector 31 of the lighting device 14. The controller 16 is configured or programmed to drive the motor 43 to move the slider 42 and the holder 13 upward or downward. The controller 16 also controls various parameters of the light emitted from the projector 31, such as energy, luminous intensity, light quantity, light wavelength band, light shape, position of the light to be applied, and timing at which light is emitted. It should be noted that the configuration of the controller 16 is not limited to specific configurations. For example, the controller 16 may be a computer, and may include a central processing unit (hereinafter also referred to as "CPU"), a ROM for storing programs or the like to be executed by the CPU, and a RAM.

Hereinabove, a configuration of the three-dimensional printing apparatus 10A has been described. As described previously, the three-dimensional printing apparatus 10A forms a whole object where supports are attached on the target object. Next, a description concerning supports will be given below.

When the three-dimensional printing apparatus 10A forms a target object, the holder 13 is raised step by step each time a resin layer is formed, and a new resin layer is formed below the preceding layer. However, if there is a resin layer with a small cross-sectional area, it is possible that the resin layer with a small cross-sectional area may not be able to support the load of all the resin layers positioned therebelow. As a consequence, there is a risk that the target object may break during object formation. In view of this problem, supports are attached and arranged on the target object in order to sufficiently support the load of the target object during object formation. This prevents the target object from breaking during object formation.

Figure 3:
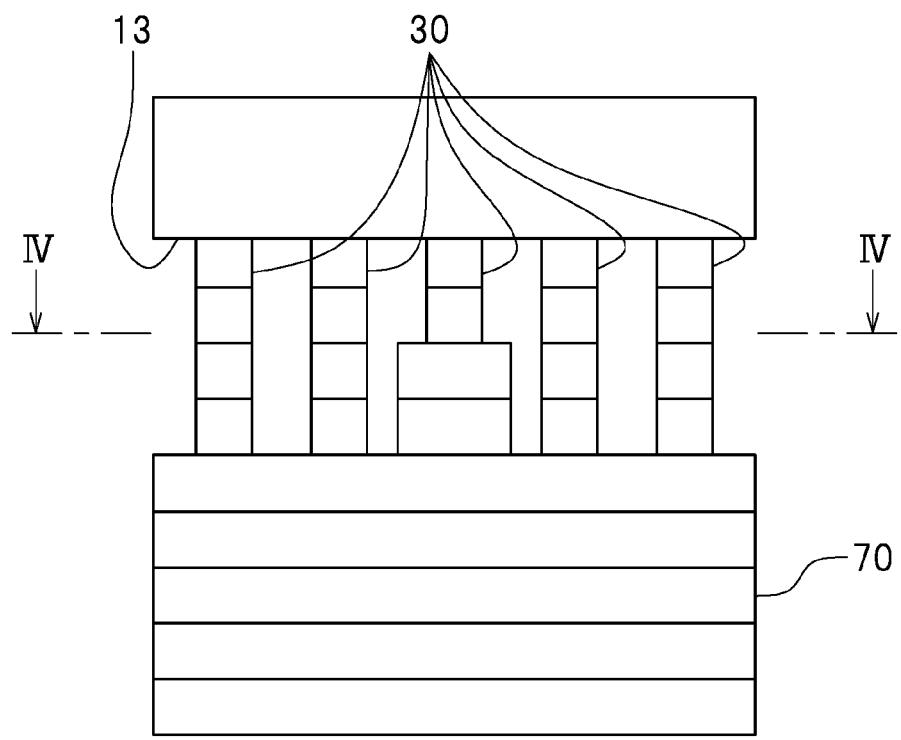
FIG. 3 is a schematic view illustrating the way where a whole object is formed on the holder.

For example, assuming that the three-dimensional printing apparatus 10A forms a target object directly on the holder 13, the target object is peeled away from the holder 13 after object formation. Then, when the portion of the target object that is in contact with the holder 13 is peeled from the holder 13, the target object may break in some cases. In view of this problem, supports 30 are attached between the holder 13 and a target object 70 to form the whole object, as illustrated in FIG. 3. Then, after the whole object (an object including the target object 70 and the supports 30) has been peeled away from the holder 13 subsequent to the completion of the object formation, the process of removing the supports 30 from the target object 70 is carried out. This prevents the target object 70 from breaking.

The supports 30 are attached on a target object by performing a predetermined computation with the controller 16. In other words, a predetermined computation is performed by the controller 16, and as a result, the supports 30 are attached on the target object. However, the predetermined computation to attach the supports 30 on the target object may be performed by a dedicated device other than the controller 16.

A force that tends to keep balance against the load of the resin layer made of the cured photocurable resin 23 acts on the holder 13. Herein, this force is referred to as "allowable stress" when necessary. The allowable stress T can be calculated, for example, by the following expression (1), where reference stress is ST and safety factor is SF.

$$T = ST/SF \quad (1)$$

Here, uncertain factors such as variations in strength from material to material or load margin of the resin layer are taken into consideration when setting the safety factor SF.

In the present preferred embodiment, because the holder 13 supports the load L of the resin layer composed of the cured photocurable resin 23, the following expression (2) holds.

$$L < T \quad (2)$$

Also, the allowable stress T can be expressed by the following expression (3), where the load supported per unit area of a single support 30 is S, the area of the single support 30 that is in contact with the target object 70 is A, and the number of the supports 30 is N:

$$T = S \times A \times N/SF \quad (3)$$

By assigning the above expression (3) to the above expression (2), the load L of the resin layer can be expressed by the following expression (4):

$$L < S \times A \times N/SF \quad (4)$$

Figure 4:
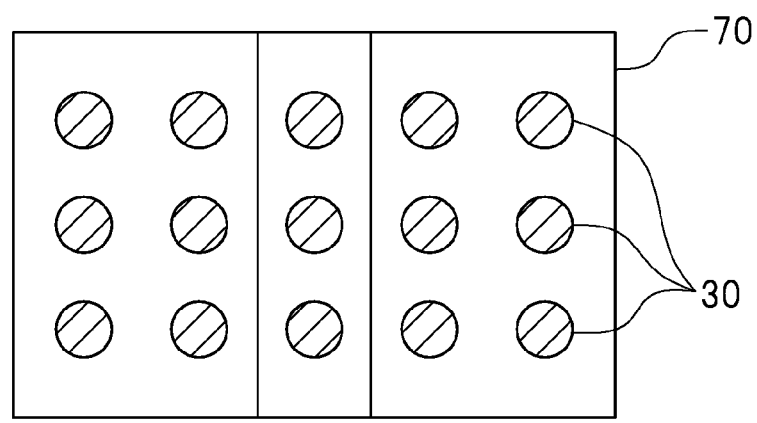
FIG. 4 is a cross-sectional view taken along line IV-IV in FIG. 3.

It should be noted that the shapes of the supports 30 are not limited to specific shapes. FIG. 4 is a cross-sectional view taken along line IV-IV in FIG. 3. As illustrated in FIG. 4, a plurality of cylindrical columns having the same thickness, i.e., having the same cross-sectional shape and the same cross-sectional area with respect to a direction perpendicular to its longitudinal direction (i.e., its height direction), are used as the supports 30 in the present preferred embodiment. Herein, as illustrated in FIG. 3, the upper end portion of each of the supports 30 is provided on the holder 13, and the lower end portion thereof is provided on the target object 70. The intervals between adjacent supports 30 are not limited to specific intervals. However, the intervals are set to be uniform herein. As illustrated in FIG. 4, a plurality of supports 30 are attached and arranged at regular intervals. The plurality of supports 30 are attached and arranged at positions that are aligned with respect to a left-right direction and a front-rear direction. It should be noted, however, that the above-described shape and position arrangement of the supports 30 are merely exemplary. The shape of the supports 30 may be, for example, a triangular or quadrangular shape in cross section. Each of the supports 30 may have an area that is in contact with the target object 70 and an area that is in contact with the holder 13, which are different from each other. For example, in the support 30, the cross-sectional area of the end portion that is in contact with the target object 70 may be smaller than the cross-sectional area of the end portion that is in contact with the holder 13. This allows the supports 30 to be easily removed from the target object 70. The plurality of supports 30 may have the same shape, but some of the supports 30 may have a different shape. The intervals between adjacent supports 30 need not be uniform. The plurality of supports 30 may be attached and arranged, for example, in a staggered arrangement.

As described previously, the three-dimensional printing apparatus 10A forms the target object 70 by raising the holder 13 step by step. The target object 70 is formed successively from the top toward the bottom. The three-dimensional printing apparatus 10A receives data of a three-dimensional model (hereinafter referred to as "target object model") of the target object 70, and using the received data, forms a target object 70 having the same or substantially the same shape as that of the target object model.

The orientation of the target object model is determined in advance (which is hereinafter referred to as the "initial orientation"). For example, when the target object model is a decorative object in a conical shape, the initial orientation is determined so that the vertex of the cone is positioned upward and the bottom surface thereof is positioned downward. However, as will be discussed below, it is not always appropriate to form the target object 70 without changing its initial orientation.

Figure 5:
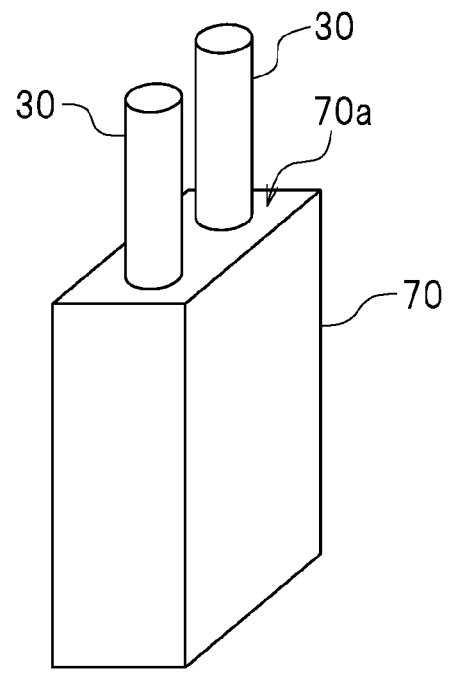
FIG. 5 is a perspective view illustrating one example showing supports are attached and arranged on a target object.
Figure 6:
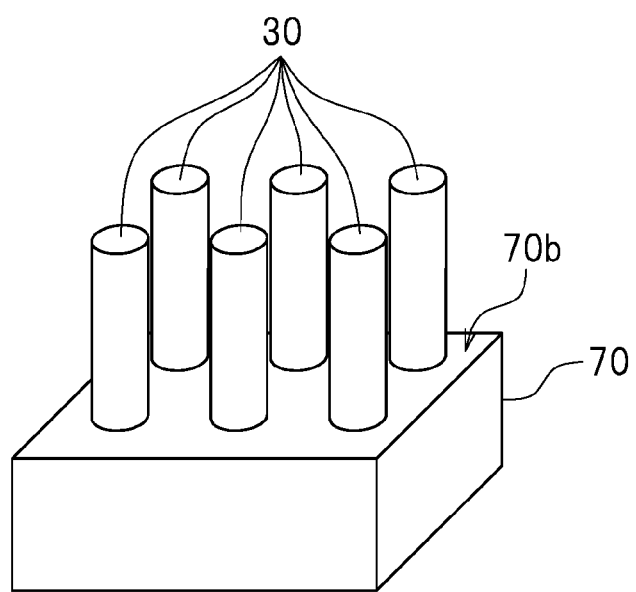
FIG. 6 is a perspective view illustrating one example showing supports are attached and arranged on a target object.

Depending on the orientation of the target object 70, there are cases where a sufficient number of supports 30 cannot be formed because the area of the surface of the target object 70 that faces the holder 13 is too small. For example, when the supports 30 are attached and arranged on the target object 70 in the orientation as shown in FIG. 5, the area of the surface 70a on which the supports 30 are attached is small. This means that the number of the supports 30 attached is accordingly small. As a consequence, there is a risk that the supports 30 may not be able to support the load of the target object 70 during object formation. On the other hand, when the supports 30 are attached and arranged on the target object 70 in the orientation as shown in FIG. 6, the area of the surface 70b on which the supports 30 are attached is larger. This means that the number of the supports 30 attached is greater than that in the example of FIG. 5. As a result, the supports 30 support the target object 70 more easily. The present inventors have discovered that the supports 30 are able to stably support the load of the target object 70 when the surface of the target object 70 is able to obtain sufficient area for the supports 30 to be attached on it.

Conventionally, the determination as to the surface of the target object 70 on which the supports 30 should be attached has often been made according to empirical rules developed by the user. Some users may not be able to arrange the supports 30 in an optimum orientation, and consequently, the allowable stress of the supports 30 may not be good enough to support the load of the target object 70. In view of this problem, in the present preferred embodiment, the arrangement determining apparatus 100 determines the optimum orientation of the target object 70 where a sufficient number of supports 30 is able to be attached on the surface of the target object 70 to the extent that allowable stress of the supports 30 is able to sufficiently support the load of the target object 70.

Figure 7:
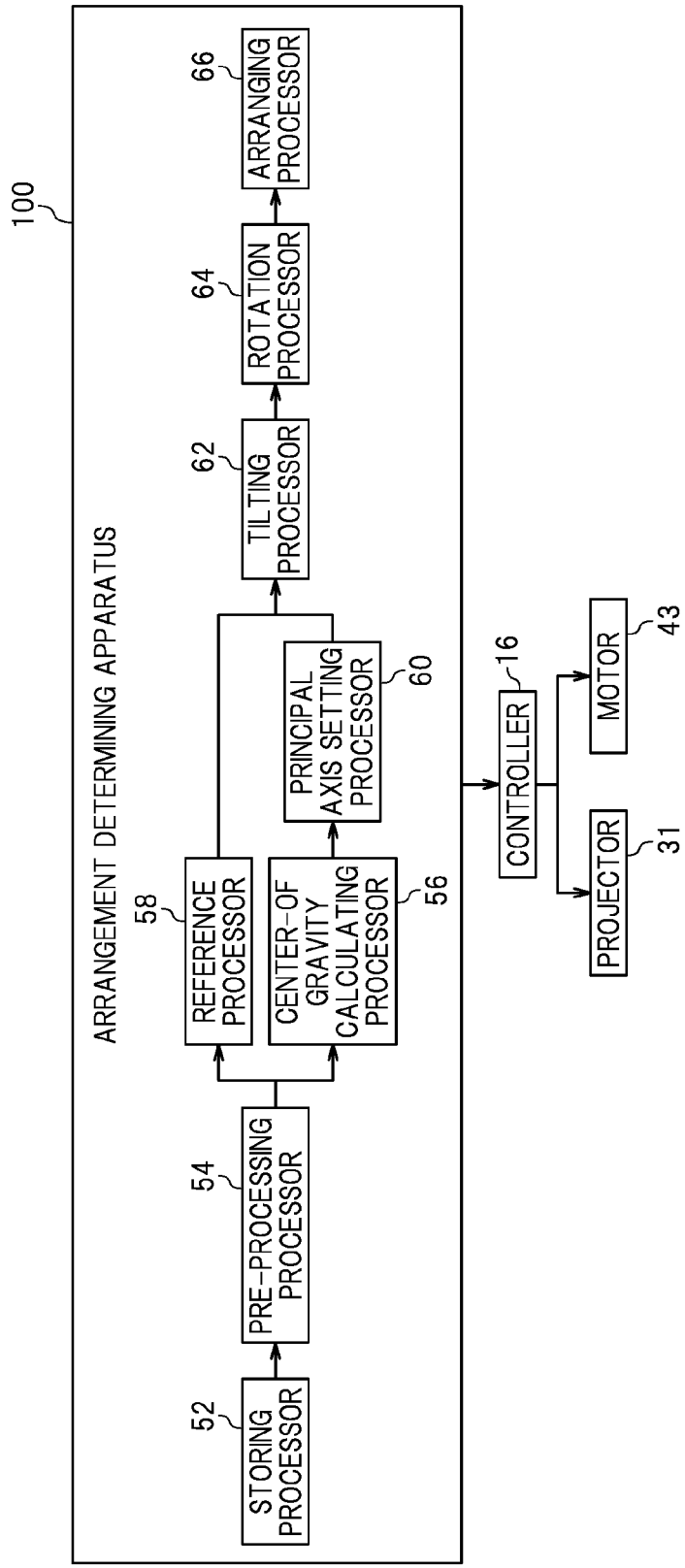
FIG. 7 is a block diagram illustrating an arrangement determining apparatus.

FIG. 7 is a block diagram illustrating the arrangement determining apparatus 100. The arrangement determining apparatus 100 may be either a separate apparatus from the three-dimensional printing apparatus 10A or may be integrated in the three-dimensional printing apparatus 10A. For example, the arrangement determining apparatus 100 may be a computer, and may include a CPU, a ROM for storing programs or the like to be executed by the CPU, a RAM, and so forth. Herein, a program stored in the computer is used to determine the position arrangement of the supports 30. The arrangement determining apparatus 100 may be either a dedicated computer designed for the three-dimensional printing system 10 or a general-purpose computer.

Figure 8:
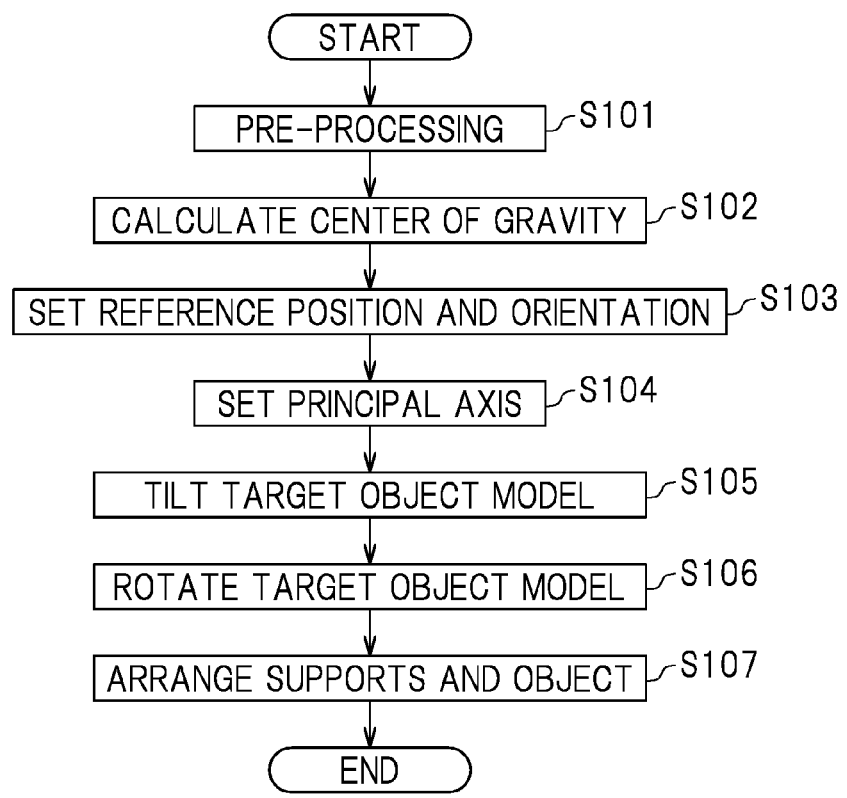
FIG. 8 is a flowchart illustrating a procedure of determining the position arrangement of the supports.
Figure 9:
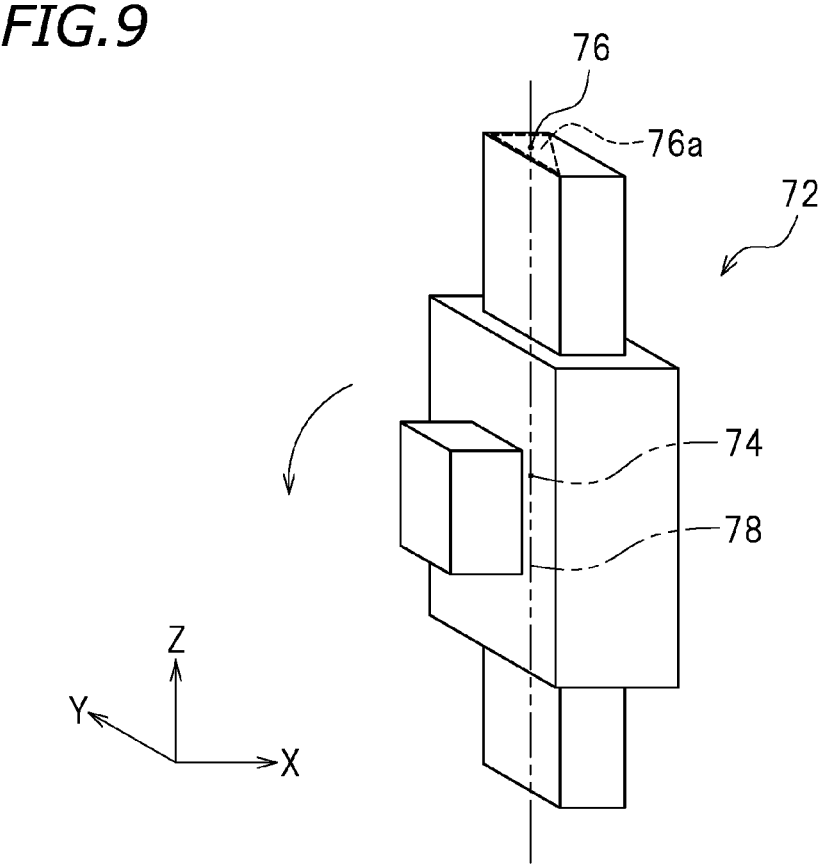
FIG. 9 is a perspective view illustrating one example of a target object model.

FIG. 8 is a flowchart illustrating a procedure of determining the position arrangement of the supports 30. FIG. 9 is a perspective view of a target object model 72. Next, a description is given of the arrangement determining apparatus 100 performing a procedure to determine which of the surfaces of the target object 70 the supports 30 should be attached and arranged on, in the target object model 72, which is the three-dimensional model of the target object 70. Herein, the supports 30 are attached and arranged on the bottom surface of the target object model 72.

Herein, the arrangement determining apparatus 100 stores data of the target object model 72 that corresponds to the target object 70 in advance. The data of the target object model 72 are, for example, data identified by a set of a plurality of points in an XYZ orthogonal coordinate system, and are three-dimensional data. For example, the target object model 72 reproduces the target object 70 by combining a plurality of triangular polygons or triangular pyramid elements.

First, at step S101, a pre-process is performed on a target object model 72 corresponding to the target object 70 to be formed. The target object model 72 is, in many cases, detail data that faithfully reproduce the three-dimensional shape of the target object 70. If the target object model 72 are used as it is, it may take a long time to perform the arrangement determining process with the arrangement determining apparatus 100. For this reason, it is preferable to reduce the amount of data of the target object model 72 by performing a pre-process on the target object model 72. Herein, a smoothing process is performed on the target object model 72. For example, the smoothing process is desirably a process of reducing the number of the triangular polygons that form the target object model 72 to reduce the amount of the data. The method of smoothing process is not limited, and any conventionally known method of smoothing process may be used. For example, a Gaussian function may be used as a method of smoothing process. The data of the target object model 72 that have been subjected to the smoothing process are stored in the arrangement determining apparatus 100.

Next, at step S102, the center of gravity of the target object model 72 is calculated. Herein, it is possible to use any conventionally known technique to calculate the center of gravity of the target object model 72. Although the method of calculating the center of gravity of the target object model 72 will not be detailed herein, the center of gravity of the target object model 72 is able to be calculated by, for example, utilizing the centers of gravity of the triangular pyramid elements that form the target object model 72. Note that in FIG. 9, the center of gravity of the target object model 72 is at a point 74.

For example, the center of gravity 74 of the target object model 72 may be calculated in the following manner. For example, it is assumed that the target object model 72 is constructed by combining a plurality of triangular pyramid elements A1, A2, . . . , An. Here, the volume Vall of the target object model 72 is calculated first. Next, the respective centers of gravity G1, G2, . . . , Gn of the triangular pyramid elements A1, A2, . . . , An, and the respective volumes V1, V2, . . . , Vn of the triangular pyramid elements A1, A2, . . . , An, are calculated. Then, the center of gravity 74 of the target object model 72 is able to be calculated by the following expression (1):

$$\text{Center of gravity } 74 = (V1 \times G1 + V2 \times G2 + \ldots + Vn \times Gn)/\text{Vall} \tag{1}$$

At step S103, the reference position and orientation of the target object model 72 are determined. In the present preferred embodiment, the position and orientation of the target object model 72 are identified by three-axis rectangular coordinates. However, it is also possible to identify the position and orientation of the target object model 72 using other coordinate systems. For example, the reference position is set so that the center of gravity 74 of the target object model 72 calculated at step S102 is brought into agreement with the central position of the holder 13 (see FIG. 1), when viewed in a plan view. The reference orientation of the target object model 72 is, for example, the orientation at the time of creating the target object model 72. The reference position and orientation of the target object model 72 are, however, not limited.

Next, at step S104, the principal axis of the target object model 72 is set. Herein, the term "principal axis" refers to the line that connects the center of gravity 74 of the target object model 72 with the most distant one of the centers of gravity of triangular polygons (hereinafter referred to as the "farthest point") from the center of gravity 74, the centers of gravity of triangular polygons being points on the outer circumferential surfaces of the target object model 72. For example, the principal axis of the target object model 72 may be set in the following manner. First, the respective distances between the center of gravity 74 of the target object model 72 and the centers of gravity of the triangular polygons that form the target object model 72 are calculated. Herein, the centers of gravity of the polygons that have already been calculated at step S102 may be used for the centers of gravity of the triangular polygons that form the target object model 72. Then, the center of gravity of the triangular polygon corresponding to the greatest one of the distances calculated above is obtained. In other words, the most distant center of gravity of the triangular polygon from the center of gravity 74 of the target object model 72 is calculated among the centers of gravity of the plurality of triangular polygons. In the target object model 72 shown in FIG. 9, the most distant triangular polygon from the center of gravity 74 of the target object model 72 is the polygon 76a, and the farthest point is the center of gravity 76 of the polygon 76a. Herein, the linear line passing through the center of gravity 74 of the target object model 72 and the farthest point 76 is a principal axis 78. It should be noted that, strictly speaking, the center of gravity 76 of the polygon 76a is not necessarily the farthest point that is most distant from the center of gravity of the target object model 72. The reason is that the polygon 76a is a plane having a certain area around the center of gravity 76. However, because the polygon 76a usually has a sufficiently small area relative to the surface area of the target object model 72, the center of gravity 76 may be regarded as the farthest point.

Figure 10:
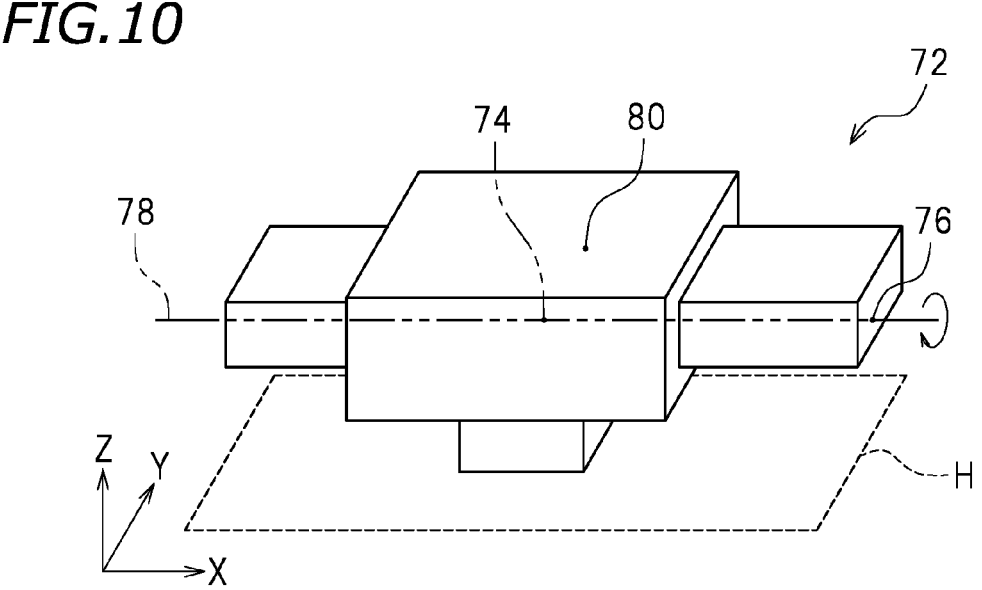
FIG. 10 is a perspective view illustrating one example of a target object model that has been tilted.

Next, at step S105, the target object model 72 that has been set in the reference position and orientation is tilted so that the principal axis 78 of the target object model 72 is parallel or substantially parallel to the horizontal plane H, as shown in FIG. 10. Herein, the horizontal plane H is a plane on which the target object 70 is to be formed, in other words, the bottom surface of the holder 13 (i.e., the face thereof facing the target object 70). Therefore, the target object model 72 that has been set in the reference position and orientation is tilted so that the principal axis 78 of the target object model 72 is parallel or substantially parallel to the bottom surface of the holder 13.

Figure 11:
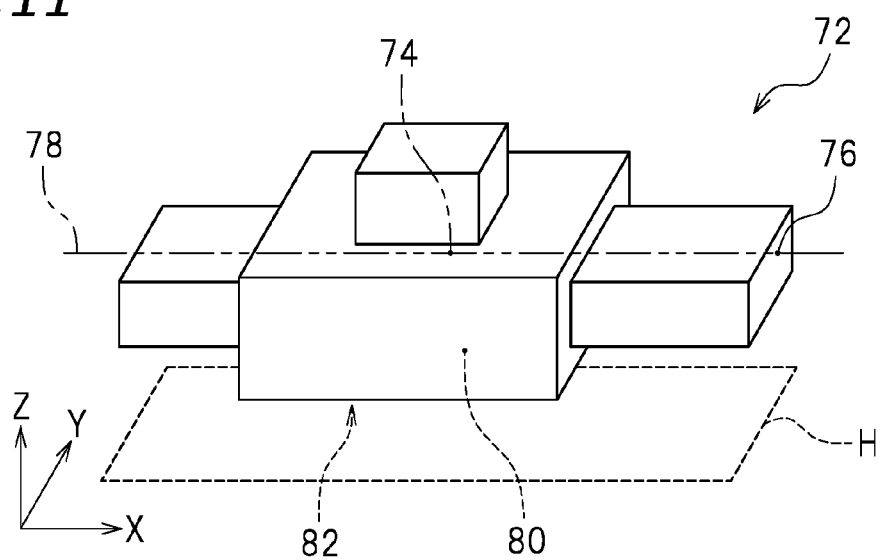
FIG. 11 is a perspective view illustrating one example of a target object model that has been rotated.

At step S106, the target object model 72 is rotated to set the surface of the target object model 72 on which the supports 30 are to be attached and arranged. Herein, the surface of the target object model 72 on which the supports 30 are to be attached and arranged is referred to as a "placement surface". The placement surface is a surface of projection of the target object model 72 to the horizontal plane H (i.e., the holder 13). In other words, the placement surface is a surface of the target object model 72 that can be seen when the target object model 72 is viewed in a vertical direction from the horizontal plane H. In the present preferred embodiment, the placement surface can be set in the following manner. First, a nearest point, which is the closest point from the center of gravity 74 of the target object model 72, is obtained among the centers of gravity of the triangular polygons on the outer circumferential surfaces of the target object model 72. In FIG. 10, the nearest point is the point 80 that is positioned on the top surface of the target object model 72. Then, the target object model 72 is rotated around the principal axis 78 so that, when viewed in a plan view, the nearest point 80 is located at a position overlapping the principal axis 78 and also downward relative to the principal axis 78. Herein, the target object model 72 is rotated around the principal axis so that the nearest point 80 is brought into the closest position to the horizontal plane H, that is, a surface of the holder 13. After the target object model 72 has been rotated, a surface that is located to be the bottom surface is the placement surface. FIG. 11 is a view illustrating the target object model 72 that has been rotated. In FIG. 11, the placement surface is a surface 82. Herein, the nearest point 80 is positioned on the placement surface 82.

Next, at step S107, a plurality of supports 30 are attached and arranged on the target object model 72. Herein, the target object 70 is formed step by step from the bottom surface, in the orientation of the target object model 72 that has been set at step S106. The plurality of the supports 30 are attached and arranged on the bottom surface of the target object model 72, that is, the placement surface 82. Herein, the shape of the plurality of supports 30 is not limited to any specific shape, and the intervals between the plurality of supports 30 are not limited to specific intervals. The shape of the plurality of supports 30 may be, for example, a cylindrical columnar shape. For example, the intervals between the plurality of supports 30 are regular intervals. For example, the contact areas of the surfaces of the plurality of supports 30 that are in contact with the target object 70 are equal or substantially equal to each other. Herein, the allowable stresses of the supports 30 to the target object 70 are equal or substantially equal to each other.

In the present preferred embodiment, the supports 30 and the target object 70 are formed below the holder 13 according to the position and orientation of the target object model 72 that has been tilted and rotated by the arrangement determining apparatus 100. Specifically, the supports 30 are formed below the holder 13, and the target object 70 is formed below the supports 30 step by step, from the bottom surface toward the top surface.

In the present preferred embodiment, the arrangement determining apparatus 100 includes the storing processor 52, the pre-processing processor 54, the center-of-gravity calculating processor 56, the reference processor 58, the principal axis setting processor 60, the tilting processor 62, the rotation processor 64, and the arranging processor 66, as illustrated in FIG. 7. The storing processor 52, the pre-processing processor 54, the center-of-gravity calculating processor 56, the reference processor 58, the principal axis setting processor 60, the tilting processor 62, the rotation processor 64, and the arranging processor 66 may be implemented by executing computer programs (hereinafter referred to as "program") stored in the arrangement determining apparatus 100.

The storing processor 52 is configured or programmed to store data of the target object model 72. The data of the target object model 72 are read from a recording medium or another computer (not shown) into the storing processor 52 by, for example, a user action.

The pre-processing processor 54 is configured or programmed to perform a smoothing process on the target object model 72 stored in the storing processor 52. For example, the pre-processing processor 54 reduces the amount of data of the target object model 72 by using a Gaussian function for the smoothing process. The pre-processing processor 54 performs the process of step S101 shown in FIG. 8.

The center-of-gravity calculating processor 56 is configured or programmed to calculate the center of gravity 74 of the target object model 72 (see FIG. 9). The method of calculating the center of gravity 74 of the target object model 72 used by the center-of-gravity calculating processor 56 is not limited, and any conventionally known method may be used. For example, it is desirable that the center-of-gravity calculating processor 56 calculate the center of gravity 74 of the target object model 72 using the centers of gravity of a plurality of triangular pyramid elements that form the target object model 72. The center-of-gravity calculating processor 56 performs the process of step S102 shown in FIG. 8.

The reference processor 58 is configured or programmed to shift and rotate the target object model 72 stored in the storing processor 52 so as to set the target object model 72 into a predetermined reference position and orientation. The predetermined reference position and orientation are not limited. For example, the predetermined reference position may be a position such that, when viewed in a plan view, the center of gravity 74 of the target object model 72 and the center of the holder 13 are in agreement with each other. The target object model 72 that has been set in a reference position and orientation is stored in the storing processor 52. The reference processor 58 performs the process of step S103 shown in FIG. 8.

The principal axis setting processor 60 is configured or programmed to set the center of gravity of the target object model 72. Herein, the principal axis setting processor 60 calculates the farthest point 76 of the target object model 72, which is most distant from the center of gravity 74 of the target object model 72, as illustrated in FIG. 9. The principal axis setting processor 60 is also configured or programmed to set the line connecting the farthest point 76 with the center of gravity 74 of the target object model 72, which has been calculated by the center-of-gravity calculating processor 56, as the principal axis 78. In the present preferred embodiment, the principal axis setting processor 60 is configured or programmed to calculate respective distances between the center of gravity 74 of the target object model 72 and the centers of gravity of a plurality of triangular polygons that form the target object model 72. Then, the principal axis setting processor 60 sets, as the principal axis 78, the line connecting the center of gravity 74 of the target object model 72 with the center of gravity 76 of the polygon 76a, which is at the greatest one of the plurality of distances between the center of gravity 74 of the target object model 72 and the centers of gravity of the plurality of triangular polygons. The principal axis setting processor 60 performs the process of step S104 shown in FIG. 8.

The tilting processor 62 is configured or programmed to tilt the target object model 72 that has been set in the predetermined reference position and orientation so that the principal axis 78 of the target object model 72 that has been set by the principal axis setting processor 60 is parallel or substantially parallel to the horizontal plane H. Herein, the surface of the holder 13 of the three-dimensional printing apparatus 10A that faces the target object 70 is the horizontal plane H (see FIG. 10). Therefore, the tilting processor 62 tilts the target object model 72 so that the principal axis 78 of the target object model 72 is parallel or substantially parallel to the horizontal plane H that faces the target object model 72. The target object model 72 that has been tilted is stored in the storing processor 52. The tilting processor 62 performs the process of step S105 shown in FIG. 8.

The rotation processor 64 is configured or programmed to rotate the target object model 72 around the principal axis 78 so as to set the nearest point 80, which is a point on the outer circumferential surfaces of the target object model 72 tilted by the tilting processor 62 and which is closest to the center of gravity 74 of the target object model 72, into a position that overlaps the principal axis 78 when viewed in a plan view. As illustrated in FIG. 11, the rotation processor 64 rotates the target object model 72 around the principal axis 78 so that the nearest point 80 is brought into the closest position to the horizontal plane H (i.e., a surface of the holder 13). The nearest point 80 is positioned on the bottom surface of the target object model 72 that has been rotated. The target object model 72 that has been rotated is stored in the storing processor 52. The rotation processor 64 performs the process of step S106 shown in FIG. 8.

The arranging processor 66 is configured or programmed to determine a position arrangement of the supports 30. The arranging processor 66 is configured or programmed to attach and arrange the supports 30 on the surface that contains the nearest point 80 (the placement surface 82) in the target object model 72 tilted by the tilting processor 62 and rotated by the rotation processor 64. Herein, the arranging processor 66 attaches and arranges the supports 30 on the bottom surface (the placement surface 82) of the target object model 72. The arranging processor 66 performs the process of step S107 shown in FIG. 8.

As described above, in the present preferred embodiment, the target object model 72 is tilted so that the principal axis of the target object model 72 is parallel or substantially parallel to the horizontal plane H, as shown in FIG. 10. As a result, the target object model 72 that has been tilted so that the principal axis 78 of the target object model 72 is parallel or substantially parallel to the horizontal plane H is allowed to have a sufficient area of the bottom surface (placement surface). Therefore, by attaching and arranging the supports 30 on the bottom surface (placement surface) of the target object model 72 that has been tilted, the allowable stress of the supports 30 is allowed to sufficiently support the load of the target object 70 in object formation. Thus, according to a preferred embodiment of the present invention, the supports 30 are attached and arranged on a target object in an optimum manner.

According to the present preferred embodiment, the rotation processor 64 obtains the nearest point 80, which is the closest point to the center of gravity 74 of the target object model 72 among the points on the outer circumferential surfaces of the target object model 72 tilted by the tilting processor 62, as illustrated in FIG. 10. Then, the rotation processor 64 rotates the target object model 72 around the principal axis 78 so as to set the nearest point 80 into a position overlapping the principal axis 78 when viewed in a plan view. This enables the supports 30 to be attached and arranged on a surface of the target object model 72 that contains the nearest point 80, which is the closest point from the center of gravity 74 of the target object model 72. In other words, it is possible to shorten the distance between the center of gravity 74 of the target object model 72 and the surface 82 of the target object model 72 on which the supports 30 are attached and arranged. The closer the center of gravity 74 of the target object model 72 is to the surface of the target object model 72 on which the supports 30 are to be attached and arranged, the less the bending moment is to the load of the target object 70. As a result, the target object 70 is allowed to be stable during object formation. Thus, the three-dimensional printing apparatus 10A is able to form the target object 70 and the supports 30 with the target object 70 being in a stable state. The present preferred embodiment is able to locate the placement surface 82 of the target object model 72 closer to the horizontal plane H (i.e., to a surface of the holder 13). This means that the length of the supports 30 is shortened. Therefore, the amount of the photocurable resin used to form the supports 30 is significantly reduced.

According to the present preferred embodiment, the center-of-gravity calculating processor 56 calculates the center of gravity 74 of the target object model 72 using the centers of gravity of a plurality of polygons that form the target object model 72. The principal axis setting processor 60 calculates respective distances between the center of gravity 74 of the target object model 72 and the centers of gravity of a plurality of triangular polygons. Then, as illustrated in FIG. 9, the principal axis setting processor 60 sets the principal axis 78 to extend along the line connecting the center of gravity 74 of the target object model 72 with the center of gravity 76 (i.e., the farthest point) of the polygon 76a that is at the greatest one of the distances between the center of gravity 74 of the target object model 72 and the centers of gravity of the triangular polygons. Thus, the principal axis setting processor 60 sets the principal axis 78 of the target object model 72 using the centers of gravity of the plurality of polygons that have already been calculated by the center-of-gravity calculating processor 56. This allows the principal axis setting processor 60 to reduce the process time required to set the principal axis 78 of the target object model 72.

In the present preferred embodiment, the pre-processing processor 54 performs a smoothing process on the target object model 72 stored in the storing processor 52. The reference processor 58 shifts and rotates the target object model 72 that has been subjected to the smoothing process by the pre-processing processor 54 so that the target object model 72 is brought in a predetermined reference position and orientation. Thus, the amount of data of the target object model 72 is reduced by smoothing the target object model 72 with the pre-processing processor 54. Therefore, the center-of-gravity calculating processor 56, the reference processor 58, the principal axis setting processor 60, the tilting processor 62, the rotation processor 64, and the arranging processor 66 are allowed to use a target object model 72 whose amount of data is reduced by the pre-processing processor 54. As a result, the computational burden is lowered in a desirable manner.

Other Preferred Embodiments

In the foregoing preferred embodiments, the arrangement determining apparatus 100 determines the position arrangement of the supports 30 so that the supports 30 are attached and arranged on the bottom surface of the target object model 72. It is also possible, however, that the supports 30 may be provided on the top surface of the target object model 72. In this case, the rotation processor 64 rotates the target object model 72 around the principal axis 78 so as to set the nearest point 80, which is a point on the outer circumferential surfaces of the target object model 72 that has been tilted by the tilting processor 62 and which is closest to the center of gravity 74 of the target object model 72, into a position that overlaps the principal axis 78, when viewed in a plan view, and also is above the principal axis 78. Then, the arranging processor 66 attaches and arranges the supports 30 on the surface that contains the nearest point 80 in the target object model 72 rotated by the rotation processor 64, that is, the top surface of the target object model 72. In this case, the top surface of the target object model 72 is the placement surface. Even in such a case, substantially the same advantageous effects achieved by the foregoing preferred embodiments are achieved by the present preferred embodiment.

Figure 12:
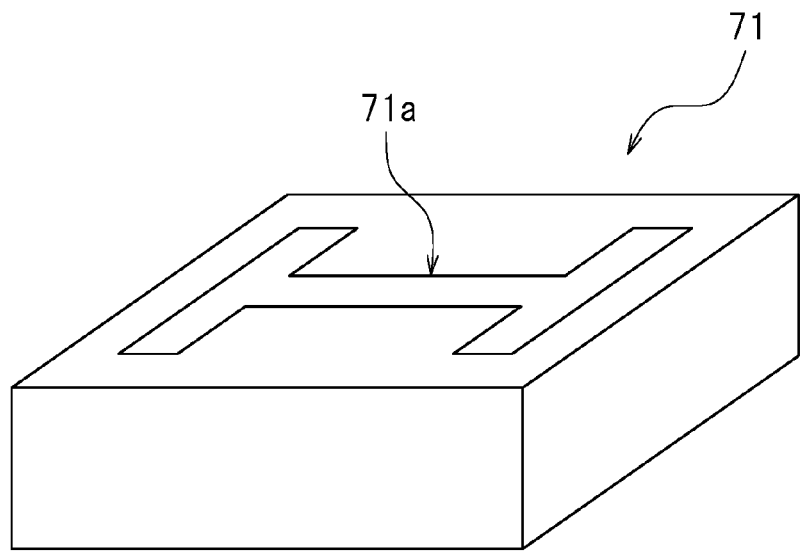
FIG. 12 is a view for illustrating a forbidden surface, which illustrates one example of the target object.
Figure 13:
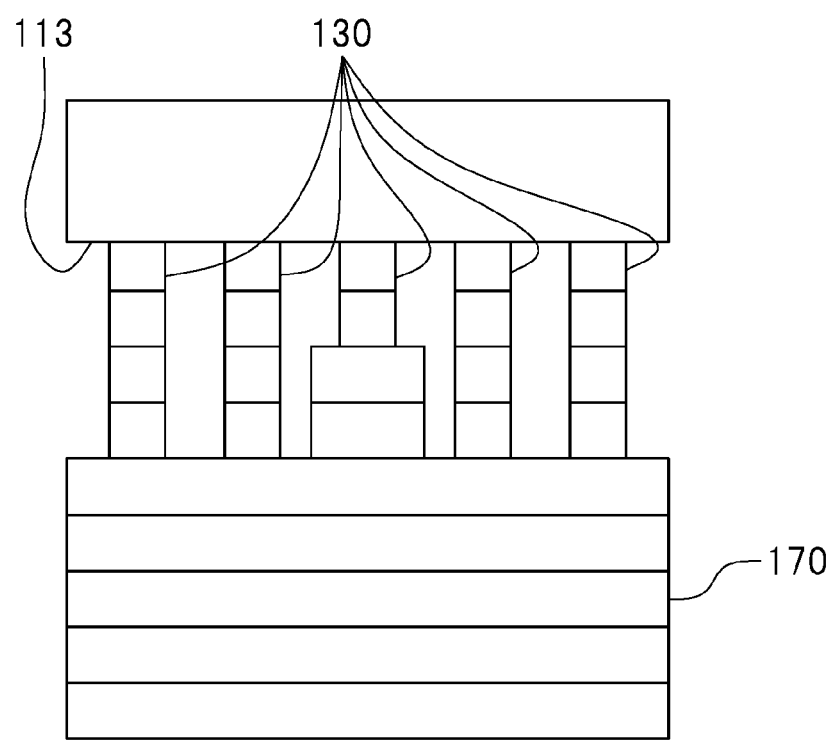
FIG. 13 is a schematic view illustrating the way where a target object and supports are formed on the holder according to conventional technology.

FIG. 12 is a view illustrating a target object 71, which illustrates a decorative surface 71a. As illustrated in FIG. 12, the target object 71 may have a decorative surface 71a that is decorated with such things as characters or patterns. In the present preferred embodiment, the decorative surface 71a corresponds to a "forbidden surface". When forming such a target object 71, it is preferable that no support 30 be attached or arranged on the decorative surface 71a. The reason is that there is a risk of damaging the decorative surface 71a of the target object 71 when peeling supports 30 away from the target object 71. Accordingly, when the target object 71 has a decorative surface 71a where no support 30 should be attached or arranged, it is preferable to determine the position and orientation of the target object 71 so that no support 30 is attached or arranged on the decorative surface 71a, in addition to the condition that the supports 30 sufficiently support the load of the target object 71.

In the present preferred embodiment, when the supports 30 are attached and arranged on a target object model corresponding to the target object 71 having the decorative surface 71a, the rotation processor 64 calculates a nearest point that is closest to the center of gravity of the target object model among the points on the outer circumferential surfaces excluding the decorative surface 71a in the target object model tilted by the tilting processor 62, and rotates the target object model around the principal axis of the target object model so that the nearest point is brought into a position overlapping the principal axis when viewed in a plan view. Herein, the nearest point is positioned in one of the surfaces of the target object model excluding the decorative surface 71a. The arranging processor 64 attaches and arranges the supports 30 on the surface where the nearest point is positioned.

Thus, the supports 30 are able to support the load of the target object 71 without attaching and arranging the supports 30 on the decorative surface 71a.

In the present preferred embodiment, the rotation processor 64 is used to rotate the target object model 72 around the principal axis 78 so that the nearest point 80 overlaps the principal axis 78 when viewed in a plan view, as illustrated in FIG. 11. Then, the arranging processor 66 attaches and arranges the supports 30 on the bottom surface (i.e., the placement surface 82) of the target object model 72 that has been rotated by the rotation processor 64. However, the rotation processor 64 may be eliminated. In that case, the arranging processor 66 may attach and arrange the supports 30 on a predetermined surface (the bottom surface in the foregoing preferred embodiment) of the target object model 72 tilted by the tilting processor 62. In this case as well, the surface on which the supports 30 are to be attached and arranged is allowed to have a sufficient area in the target object model 72. As a result, the supports 30 are able to sufficiently support the load of the target object 70.

In the present preferred embodiment, the principal axis setting processor 60 sets the principal axis 78 of the target object model 72 using the centers of gravity of a plurality of polygons that form the target object model 72. The principal axis 78 is the line connecting the center of gravity 74 of the target object model 72 with one of the centers of gravity of a plurality of triangular polygons (herein, the farthest point 76). The principal axis 78 may, however, be the line connecting the center of gravity 74 of the target object model 72 with one of the vertices of a plurality of triangular polygons that is most distant from the center of gravity 74. In this case, the principal axis setting processor 60 calculates respective distances between the center of gravity 74 of the target object model 72 and the vertices of a plurality of triangular polygons that form the target object model 72. Then, the principal axis setting processor 60 may define a vertex of the triangular polygon corresponding to the greatest distance among a plurality of distances between the center of gravity 74 of the target object model 72 and the vertices of a plurality of triangular polygons to be the farthest point, and set the line connecting the farthest point and the center of gravity 74 of the target object model 72 as the principal axis 78.

For example, it is possible that a shape of a human body with arms spread laterally (the shape is hereinafter simply referred to as the "human body shape") needs to be formed. In this case, the loads of the arm portions and the leg portions are lower than, for example, that of the torso portion. Accordingly, when it is required to form a target object having a region with a relatively lower load, it is possible to set the farthest point in a region excluding the region with a lower load, i.e., the region with a relatively higher load, to set the principal axis by the principal axis setting processor 60. For example, when the above-mentioned human body shape is the target object, it is possible to set the farthest point in the region excluding the arms and the legs, which have a relatively lower load, to set the principal axis.

Alternatively, when the target object includes a cubic-shaped object and a plurality of thin rod-shaped objects extending outward from the surfaces of a cubic-shaped object, for example, it is possible that the load on the rod-shaped objects may be negligible relative to the total load of the entire target object. In this case, it is possible to set the farthest point in the cubic-shape object of the target object excluding the rod-shaped objects to set the principal axis by the principal axis setting processor 60. In this way, it is possible to appropriately select the region where the farthest point should be set according to the shape of the target object. The region where the farthest point should be set may be selected by the user, for example. In these cases as well, the supports 30 can be attached and arranged in the region of the target object where the load is relatively high. Therefore, the supports 30 are able to be attached and arranged at optimum positions on the target object.

In the above-described preferred embodiment, when the arrangement determining apparatus 100 determines the position arrangement of the supports 30 at step S101, the pre-processing processor 54 performs a smoothing process on the target object model 72 stored in the storing processor 52 in advance. However, the pre-processing at step S101 may be eliminated. In this case, the reference processor 58 may shift and rotate the target object model 72 stored in the storing processor 52 so as to set the target object model 72 into a predetermined reference position and orientation.

As described previously, the processors in the arrangement determining apparatus 100, namely the storing processor 52, the pre-processing processor 54, the center-of-gravity calculating processor 56, the reference processor 58, the principal axis setting processor 60, the tilting processor 62, the rotation processor 64, and the arranging processor 66, may be implemented by a single processor provided in the arrangement determining apparatus 100. However, these processors may be implemented by a plurality of processors. In various preferred embodiments of the present invention, the configuration includes executing a computer program stored in a computer. Various preferred embodiments of the present invention include a non-transitory computer readable medium in which the computer program is temporarily stored. Various preferred embodiments of the present invention also include a circuit that implements the same functions as those implemented by the programs executed by the respective processors. In this case, it is possible that the storing processor 52, the pre-processing processor 54, the center-of-gravity calculating processor 56, the reference processor 58, the principal axis setting processor 60, the tilting processor 62, the rotation processor 64, and the arranging processor 66 be replaced with a storing circuit 52, a pre-processing circuit 54, a center-of-gravity calculating circuit 56, the reference circuit 58, a principal axis setting circuit 60, a tilting circuit 62, a rotation circuit 64, and an arranging circuit 66, respectively.

The terms and expressions which have been used herein are used as terms of description and not of limitation. There is no intention in the use of such terms and expressions of excluding any equivalents of any of the features shown or described, or portions thereof, and it is recognized that various modifications are possible within the scope of the present invention. The present invention may be embodied in many different forms. This disclosure should be considered as providing exemplary preferred embodiments of the principles of the present invention. These preferred embodiments are described herein with the understanding that such preferred embodiments are not intended to limit the present invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or discussed during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system comprising:
a three-dimensional printing apparatus that forms a target object and supports; and
a support arrangement determining apparatus that determines a position arrangement of the supports, for use with the three-dimensional printing apparatus wherein the supports are attached and arranged on the target object to be formed to form the target object and the supports, the support arrangement determining apparatus including:
a storing processor configured or programmed to store data of a three-dimensional model of the target object;
a reference processor configured or programmed to shift and rotate the three-dimensional model stored in the storing processor so as to set the three-dimensional model into a predetermined reference position and orientation;
a center-of-gravity calculating processor configured or programmed to calculate a center of gravity of the three-dimensional model;
a principal axis setting processor configured or programmed to calculate, among points on outer circumferential surfaces of the three-dimensional model, a farthest point that is most distant from the center of gravity of the three-dimensional model calculated by the center-of-gravity calculating processor, and set a principal axis connecting the center of gravity of the three-dimensional model and the farthest point;
a tilting processor configured or programmed to tilt the three-dimensional model set in the predetermined reference position and orientation by the reference processor so that the principal axis set by the principal axis setting processor is parallel or substantially parallel to a horizontal plane; and
an arranging processor configured or programmed to attach and arrange the supports on a top surface or a bottom surface of the three-dimensional model tilted by the tilting processor, wherein
the three-dimensional printing apparatus forms the target object based on the three-dimensional model tilted by the tilting processor, and the three-dimensional printing apparatus forms the supports as attached and arranged by the arranging processor.

2. The three-dimensional printing system according to claim 1, further comprising:
a rotation processor configured or programmed to calculate a nearest point that is a closest point to the center of gravity of the three-dimensional model among the points on the outer circumferential surfaces of the three-dimensional model tilted by the tilting processor, and rotate the three-dimensional model around the principal axis so as to set the nearest point into a position that overlaps the principal axis when viewed in a plan view; wherein
the arranging processor is configured or programmed to attach and arrange the supports on one of the top surface and the bottom surface on which the nearest point is positioned in the three-dimensional model tilted by the tilting processor.

3. The three-dimensional printing system according to claim 2, wherein
the target object includes a forbidden surface where the supports are not attached or arranged; and
the rotation processor is configured or programmed to calculate the nearest point among the points on the outer circumferential surfaces excluding the forbidden surface.

4. The three-dimensional printing system according to claim 1, wherein
the three-dimensional model is obtained by combining a plurality of polygons;
the center-of-gravity calculating processor is configured or programmed to calculate the center of gravity of the three-dimensional model using centers of gravity of the plurality of polygons; and
the principal axis setting processor is configured or programmed to calculate respective distances between the center of gravity of the three-dimensional model calculated by the center-of-gravity calculating processor and the centers of gravity of the plurality of polygons, and sets the principal axis into a line connecting the center of gravity of the three-dimensional model and a point at the center of gravity of one of the polygons having a greatest distance between the center of gravity of the three-dimensional model and the centers of gravity of the polygons.

5. The three-dimensional printing system according to claim 1, further comprising:
a pre-processing processor configured or programmed to perform a smoothing process on the three-dimensional model stored in the storing processor; wherein
the reference processor is configured or programmed to shift and rotate the three-dimensional model that has been subjected to the smoothing process by the pre-processing processor so as to set the three-dimensional model into a predetermined reference position and orientation.

6. A method of forming a target object and supports including a process of determining an arrangement of the supports, for use with a three-dimensional printing apparatus wherein the supports are attached and arranged on the target object to be formed to form the target object and the supports, for determining a position arrangement of the supports, the method comprising:
a storing step of storing data of a three-dimensional model of the target object;
a reference step of shifting and rotating the three-dimensional model stored in the storing step so as to be in a predetermined reference position and orientation;

a center-of-gravity calculating step of calculating a center of gravity of the three-dimensional model;

a principal axis setting step of calculating, among points on outer circumferential surfaces of the three-dimensional model, a farthest point that is most distant from the center of gravity of the three-dimensional model calculated in the center-of-gravity calculating step, and setting a principal axis connecting the center of gravity of the three-dimensional model and the farthest point;

a tilting step of tilting the three-dimensional model set in the predetermined reference position and orientation in the reference step so that the principal axis set in the principal axis setting step is parallel or substantially parallel to a horizontal plane;

an arranging step of attaching and arranging the supports on a top surface or a bottom surface of the three-dimensional model tilted in the tilting step; and a step of forming, by the three-dimensional printing apparatus, the target object based on the three-dimensional model tilted in the tilting step, and forming the supports attached and arranged in the arranging step.

7. The method according to claim 6, further comprising:

a rotation step of calculating a nearest point that is a closest point from the center of gravity of the three-dimensional model among the points on the outer circumferential surfaces of the three-dimensional model tilted in the tilting step, and rotating the three-dimensional model around the principal axis so as to set the nearest point into a position that overlaps the principal axis when viewed in a plan view; wherein in the arranging step, the supports are attached and arranged on one of the top surface and the bottom surface on which the nearest point is positioned in the three-dimensional model tilted in the tilting step.

8. The method according to claim 7, wherein the target object includes a forbidden surface where the supports are not attached or arranged; and in the rotation step, the nearest point is calculated among the points on the outer circumferential surfaces excluding the forbidden surface.

9. The method according to claim 6, wherein the three-dimensional model is obtained by combining a plurality of polygons;

in the center-of-gravity calculating step, the center of gravity of the three-dimensional model is calculated using centers of gravity of the plurality of polygons; and in the principal axis setting step, respective distances are calculated between the center of gravity of the three-dimensional model calculated in the center-of-gravity calculating step and the centers of gravity of the plurality of polygons, and the principal axis set to be a line connecting the center of gravity of the three-dimensional model and a point at the center of gravity of one of the polygons having a greatest distance between the center of gravity of the three-dimensional model and the centers of gravity of the polygons.

10. The method according to claim 6, wherein:

a pre-processing step of performing a smoothing process on the three-dimensional model stored in the storing step; wherein in the reference step, the three-dimensional model that has been subjected to the smoothing process in the pre-processing step is shifted and rotated so that the three-dimensional model is in a predetermined reference position and orientation.

* * * * *